US 9,826,674 B2

(12) United States Patent
Matthews

(10) Patent No.: US 9,826,674 B2
(45) Date of Patent: Nov. 28, 2017

(54) VEHICLE GUIDANCE SYSTEM

(71) Applicant: AGCO Corporation, Hesston, KS (US)

(72) Inventor: Paul Ross Matthews, Bayern (DE)

(73) Assignee: AGCO Corporation, Duluth, GA (US)

(*) Notice: Subject to any disclaimer, the term of this patent is extended or adjusted under 35 U.S.C. 154(b) by 38 days.

(21) Appl. No.: 14/798,098

(22) Filed: Jul. 13, 2015

(65) Prior Publication Data

US 2016/0021813 A1    Jan. 28, 2016

Related U.S. Application Data

(60) Provisional application No. 62/028,843, filed on Jul. 25, 2014.

(51) Int. Cl.
| | | |
|---|---|---|
| *G01C 22/00* | (2006.01) | |
| *G05D 1/00* | (2006.01) | |
| *A01B 79/00* | (2006.01) | |
| *G01C 21/00* | (2006.01) | |
| *A01B 69/00* | (2006.01) | |

(52) U.S. Cl.
CPC ............ *A01B 79/005* (2013.01); *A01B 69/00* (2013.01); *A01B 69/004* (2013.01); *A01B 69/007* (2013.01); *G01C 21/005* (2013.01)

(58) Field of Classification Search
CPC ... A01B 79/005; A01B 69/007; A01B 69/004; A01B 69/00; G01C 21/005
USPC ........................................................ 701/1, 26
See application file for complete search history.

(56) References Cited

U.S. PATENT DOCUMENTS

| | | | | |
|---|---|---|---|---|
| 7,277,792 | B2 * | 10/2007 | Overschie ............ | A01B 69/008 180/167 |
| 8,131,432 | B2 * | 3/2012 | Senneff ................ | A01B 69/007 701/23 |
| 8,346,443 | B2 * | 1/2013 | Senneff ................ | A01B 69/007 340/988 |
| 8,583,326 | B2 * | 11/2013 | Collins ................. | A01B 69/007 342/357.22 |
| 8,606,454 | B2 * | 12/2013 | Wang .................. | A01D 41/1278 180/6.24 |
| 8,694,382 | B2 * | 4/2014 | Aznavorian ........... | G05D 1/021 250/307 |
| 2005/0171684 | A1 * | 8/2005 | Turner .................. | A01B 69/008 701/468 |
| 2009/0216406 | A1 | 8/2009 | Senneff et al. | |
| 2011/0196565 | A1 * | 8/2011 | Collins ................. | A01B 69/007 701/26 |

(Continued)

FOREIGN PATENT DOCUMENTS

WO        03/019430  A1    3/2003

OTHER PUBLICATIONS

European Patent Office, International Search Report for related European Application No. EP15176780, dated Dec. 14, 2015.

*Primary Examiner* — Jaime Figueroa

(57) ABSTRACT

In one embodiment, a method comprising receiving input corresponding to a first contour wayline to enable auto-steer traversal by a vehicle over a field; generating a plurality of contour waylines based on the first contour wayline; identifying a non-drivable section among the plurality of contour waylines, the identifying based on information corresponding to a time for the vehicle to reach a minimum turning radius and the minimum turning radius; and generating an alternative contour wayline section for the identified non-drivable section.

15 Claims, 13 Drawing Sheets

(56) References Cited

U.S. PATENT DOCUMENTS

2012/0197495 A1* 8/2012 Senneff ............... A01B 69/007
 701/42
2012/0215381 A1* 8/2012 Wang ................. A01D 41/1278
 701/2
2012/0215395 A1* 8/2012 Aznavorian ........... G05D 1/021
 701/25

* cited by examiner

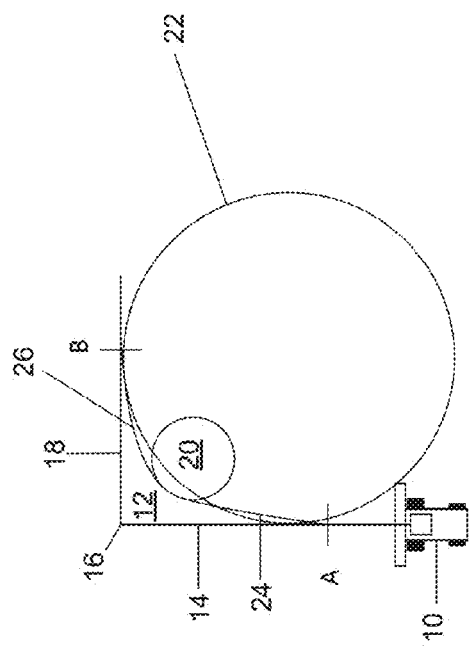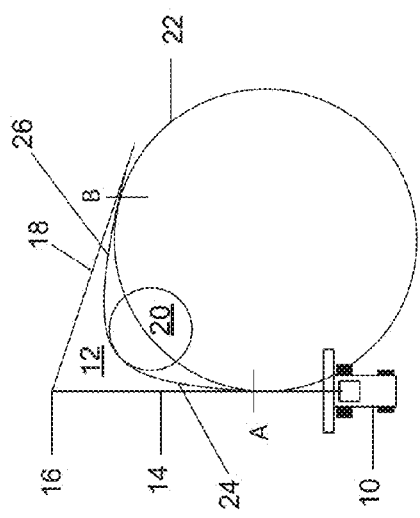

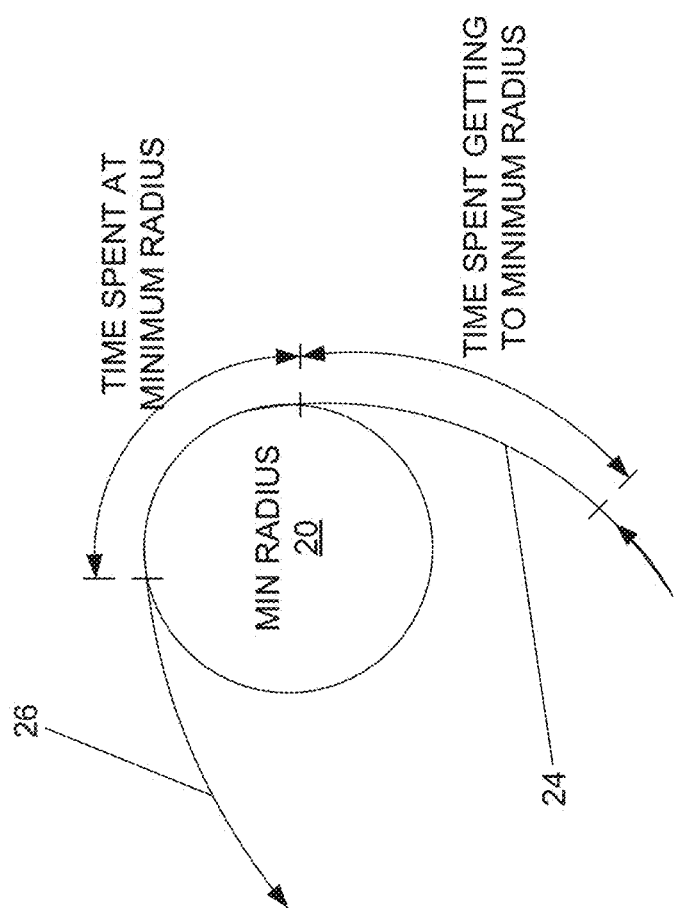

VEHICLE GUIDANCE SYSTEM

CROSS REFERENCE TO RELATED APPLICATION

This application claims the benefit of U.S. Provisional Application No. 62/028,843 filed Jul. 25, 2014, which is hereby incorporated by reference in its entirety.

TECHNICAL FIELD

The present disclosure is generally related to agriculture technology, and, more particularly, precision farming.

BACKGROUND

In the field of auto-guidance in agriculture, a number of paths are desired: from straight paths (e.g., A-B), to circular center pivots, to various forms of user-defined contours. Path planning involves creating successive parallel paths to the original defined by a user (e.g., operator), each offset by the implement width, so that the vehicle in which the operator controls may automatically cover the whole field.

With non-linear path types (e.g., contours and pivots), existing algorithms may create situations where non-drivable paths or sections are generated because the defined paths are physically unnavigable.

BRIEF DESCRIPTION OF THE DRAWINGS

Many aspects of a vehicle guidance system can be better understood with reference to the following drawings. The components in the drawings are not necessarily to scale, emphasis instead being placed upon clearly illustrating the principles of a vehicle guidance system. Moreover, in the drawings, like reference numerals designate corresponding parts throughout the several views.

FIG. 1 is a schematic diagram that illustrates an example vehicle and creation of an alternative path based on detection by an embodiment of a vehicle guidance system of a non-drivable segment.

FIG. 2 is a schematic diagram that illustrates an example vehicle and creation of another alternative path based on detection by an embodiment of a vehicle guidance system of a non-drivable segment.

FIGS. 6A-6D are schematic diagrams that graphically illustrate a methodology underlying an embodiment of a vehicle guidance system in detecting a non-drivable segment and providing an alternative path.

DESCRIPTION OF EXAMPLE EMBODIMENTS

Overview

Figure 3:
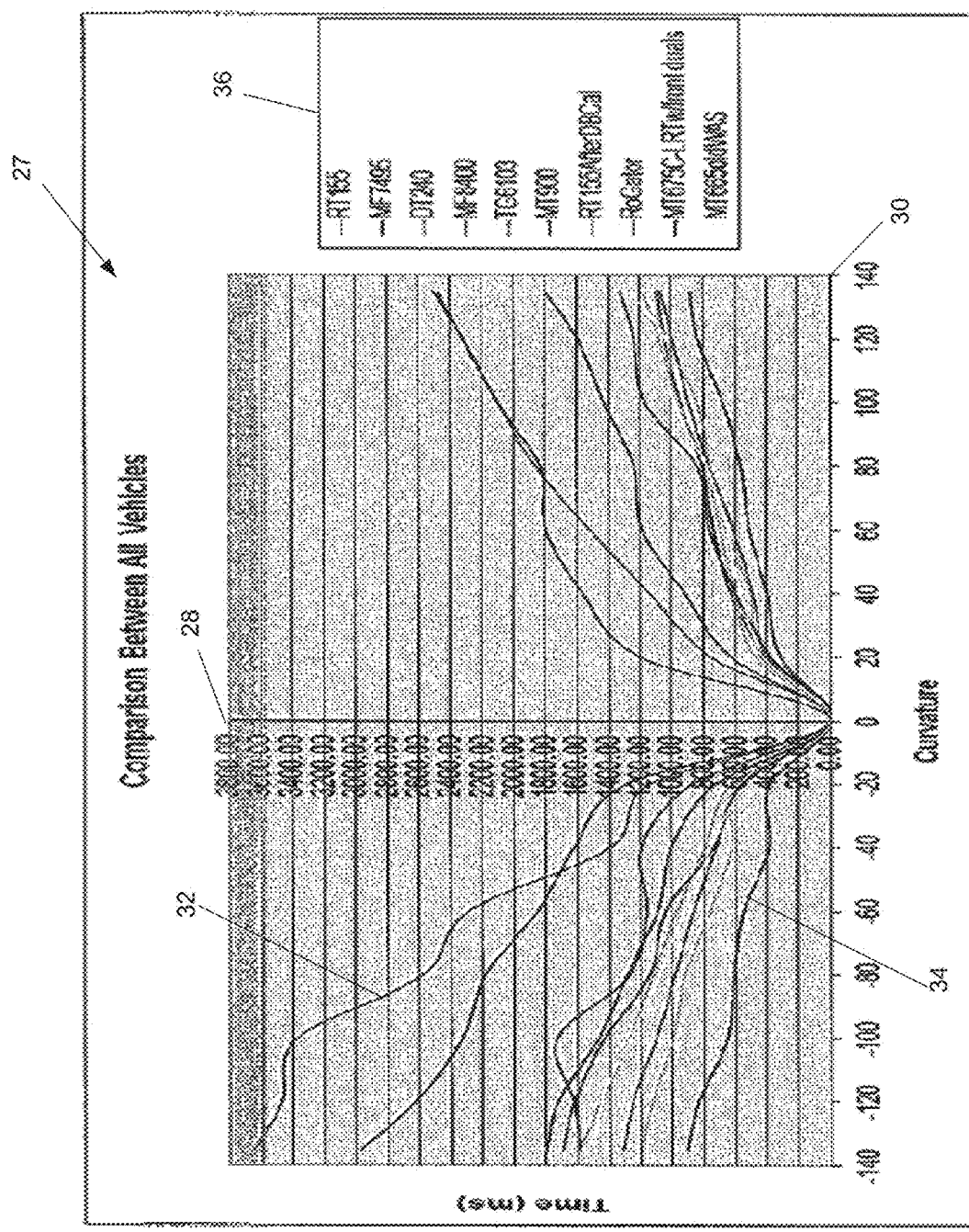
FIG. 3 is a schematic diagram that illustrates a comparison of lock-to-lock timing for various machines.

In one embodiment, a method comprising receiving input corresponding to a first contour wayline to enable auto-steer traversal by a vehicle over a field; generating a plurality of contour waylines based on the first contour wayline; identifying a non-drivable section among the plurality of contour waylines, the identifying based on information corresponding to a time for the vehicle to reach a minimum turning radius and the minimum turning radius; and generating an alternative contour wayline section for the identified non-drivable section.

DETAILED DESCRIPTION

Certain embodiments of vehicle guidance systems and methods are disclosed that detect non-drivable paths or segments of contour waylines and replace them with drivable paths or segments that the vehicle is physically capable of navigating (e.g., steering). In one embodiment, a vehicle guidance system comprises a computing device, such as a controller (e.g., electronic control unit or ECU) that determines an alternative (drivable) path based on one or more factors relevant to an ability of the vehicle to turn.

Digressing briefly, previous methods only used a vehicle's minimum turning radius as a detector for non-drivable paths, which is typically seen as two tangential intersects of a circle. The non-drivable section between the tangents is then replaced by a part of the circle between the tangents which defines the minimum turning radius for the vehicle. As the joining of the circle to the current path is tangential, this means that the vehicle is required to change from wheels positioned straight ahead to full lock in an instant, which is not possible even with agile machines like tracked vehicles and windrowers. As a result of providing a path that is not drivable, not only does the vehicle skip the non-drivable area, but it causes unsightly (and inefficient) under-steering due to the tightness of the requested turn, which can have ripple effects in the generation of successive paths. In contrast, certain embodiments of a vehicle guidance system consider the fact that steering the drivable axle(s) of the vehicle takes time and thus it is not possible to immediately steer to full lock. By considering the time it takes to steer a specific vehicle and the minimum curvature that is permitted on that vehicle at a given speed, a realistic path can be provided that actually can be traversed. As a result of providing paths that can actually be steered, the amount of overlap is reduced, and a better (truer) path is provided that can be referenced on successive pass calculations.

Having summarized certain features of vehicle guidance systems of the present disclosure, reference will now be made in detail to the description of a vehicle guidance system as illustrated in the drawings. While a vehicle guidance system will be described in connection with these drawings, there is no intent to limit it to the embodiment or embodiments disclosed herein. For instance, in the description that follows, one focus is on agricultural vehicles, though it should be appreciated that some embodiments of vehicle guidance systems may use vehicles from other industries, and hence are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1, shown is a schematic diagram that illustrates an example vehicle and creation of an alternative path based on detection by an embodiment of a vehicle guidance system of a non-drivable segment. It should be appreciated within the context of the present disclosure that the paths illustrated herein are merely illustrative, and that other path configurations are contemplated to be within the scope of the disclosure. A vehicle 10 (e.g., combine harvester, though other vehicles in the same or different industries may be used) is shown traversing a field 12 according to waylines that are generated a priori. The vehicle 10 is traveling along input path 14. The initial waylines dictate that the vehicle 10 is to change direction at intersection point 16, and subsequently travel along exit path 18. Based on at least a minimum vehicle turning radius represented by circle 20, it is evident that the vehicle 10 should at least follow the arc of the circle 20 at the intersection point 16, as that location represents a non-drivable segment. However, as indicated previously, merely relying on the minimum turning radius to navigate around the non-drivable segment is inadequate, since going from straight ahead to full lock takes time and is speed dependent. An embodiment of a vehicle guidance system thus detects the non-drivable segment using a geometric construct during wayline processing, and in this example, detects the non-drivable segment using a larger, variable radius circle 22 that simultaneously intersects the input path 14 and exit path 18 at tangent intercepts A and B, respectively. The larger, variable radius circle 22 has a radius that varies depending on the speed of the vehicle 10 as it enters a turn, as described further below. The larger, variable radius circle 22 is determined based on the construction of two ellipse-like shapes or curves (e.g., where the exit and entry curves are mirrors of each other) that respectively represent the path the vehicle 10 is to travel to go from straight (e.g., along input path 14) to the minimum turning radius (e.g., on an arc of the circle 20) and then immediately, or after a defined period traveling along the circle 20, to return to straightening (e.g., along the exit path 18). In other words, to negotiate a turn, an embodiment of the vehicle guidance system takes into consideration the minimum turning radius for the current or planned speed of the vehicle 10 and the time it takes to turn the wheels (e.g., in this example, to go from straight-aligned wheels along the input path 14 to the minimum turning radius and back to straight aligned wheels along exit path 18). The larger, variable radius circle 22 is used to detect the non-drivable segment, with the circle 22 derived by the construction of a curve or ellipse-like section 24 (e.g., from tangent point A to a point tangential to the minimum turning radius circle 20) and a curve or ellipse-like section 26 (e.g., from a point tangential to the minimum turning radius circle 20 to the tangent point B) that, along with the minimum turning radius circle 20, collectively comprise an alternative path that is drivable by the vehicle 10. In other words, the vehicle 10 is automatically guided to steer along an alternative path corresponding to the larger, variable radius circle 22 made up of curves or ellipse-like sections 24, 26, and zero or more distance along the minimum turning radius circle 20. This mechanism performed by an embodiment of the vehicle guidance system automatically detects non-drivable segments and navigates around them according to an alternative path throughout the field 12.

Referring to FIG. 2, shown is a schematic diagram that illustrates the creation of another alternative path based on detection by an embodiment of a vehicle guidance system of a non-drivable segment. Once again, the vehicle 10 traverses the field 12 along an input path 14, with the need to change direction at point 16 to enable traversal of the field 12 along exit path 18. This intersection at point 16 represents a non-drivable segment, and in fact, is associated with a required turning angle that is more acute than the scenario represented in FIG. 1. Similar to the description in association with FIG. 1, the reliance on the minimum turning radius represented by minimum turning radius circle 20 is insufficient given the requirement to reach full lock. An embodiment of the vehicle guidance system scans ahead the waylines that dictate autonomous travel by the vehicle 10 along the field 12, and automatically detects the non-drivable segment based on concurrent intercepts at tangent points A and B using a larger, variable radius circle 22 that is constructed using curves or ellipse-like sections 24 and 26 and the minimum turning radius circle 20. An embodiment of a vehicle guidance system takes into consideration the minimum turning radius for the current or planned speed of the vehicle 10 and the time it takes to turn the wheels of the vehicle 10 (e.g., in this example, to go from straight-aligned wheels along the input path 14 to the minimum turning radius according to the ellipse-like section 24 and back to straight aligned wheels along exit path 18 according to the ellipse-like section 26). Responsive to the detection, an alternative path comprising the ellipse-like sections 24, 26 and the minimum turning radius circle 20 is determined.

Figure 4:
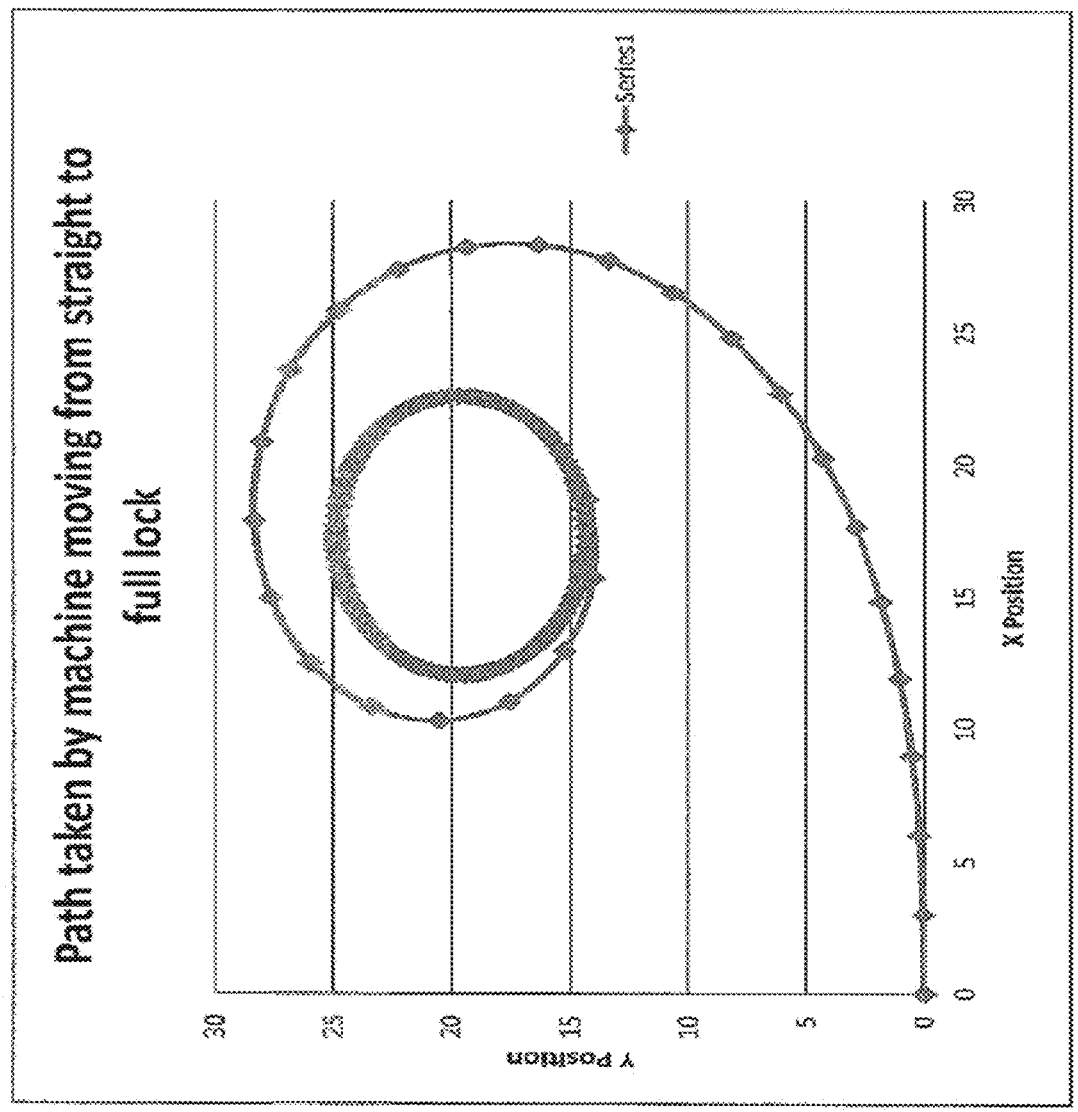
FIG. 4 is a schematic diagram that illustrates an example path taken by a vehicle moving from straight to full lock.

Having generally described example operations of a vehicle autonomously guided by an embodiment of a vehicle guidance system, attention is directed to FIGS. 3-5D, which illustrate underlying factors and mechanisms employed by certain embodiments of a vehicle guidance system. Referring to FIG. 3, shown is a schematic diagram 27 that illustrates a comparison of lock-to-lock timing for various example vehicles. The diagram 27 reveals a vertical axis (y-axis) 28 that corresponds to time (in milliseconds or ms) and a horizontal axis (X-axis) 30 that corresponds to curvature, which corresponds to an inverse of the radius of a circle. The zero (0) point on the horizontal axis 30 may be viewed as when the steering wheels of a vehicle are locked in a straight or forward (or reverse) orientation, such as along input path 14 and exit path 18 of FIG. 1, and curves extending in the +/− direction from the zero point correspond to the time for the associated vehicle to reach the minimum turning radius (e.g., from tangent point A to the minimum turning radius circle 20, FIG. 1). For instance, curve 32 reveals that the associated vehicle (as associated in an index 36 that lists types of vehicles) takes the longest to go from straight wheels to fully-turned or locked position. Alternatively, curve 34 corresponding to one of the vehicles listed in the index 36 reveals the best performance (the fastest time to reach full lock from straight wheels). Also evident from the diagram 27 is, the tighter the turn, the longer it takes to reach a given curvature. For instance, for the vehicle associated with the curve 32, it takes approximately 2200 ms to reach a curvature of −60, whereas a curvature of approximately −90 takes 3400 ms. This fact highlights why relying exclusively on the minimum turning radius to maneuver past non-drivable segments is inadequate, causing the vehicle to slide off the circle and likely dis-engage from auto-guidance (i.e., requiring manual control). FIG. 4 is a schematic diagram 38 that further illustrates a path taken by a vehicle moving from straight wheel alignment to full lock. As noted, there is a gradual progression until the minimum turning radius is achieved.

Referring again to FIG. 3, note that the diagram 27 comprises time and curvature information for a plurality of vehicles that may be recorded in a data structure (e.g., database). In some embodiments, time and curvature information for fewer vehicles may be recorded, or variations of the data that achieves the same purpose of providing information that an embodiment of the vehicle guidance system may use to detect non-drivable segments and provide for an alternative path may be recorded. In one embodiment, the data structure may be stored locally (e.g., in the vehicle, such as in memory or a storage unit), or stored externally (e.g., in a local field server accessed via a wireless connection, in a remote server accessed over a network, such as via browser software and telemetry functionality located in the vehicle or on a mobile communications device possessed by an operator of the vehicle).

Figure 5A:
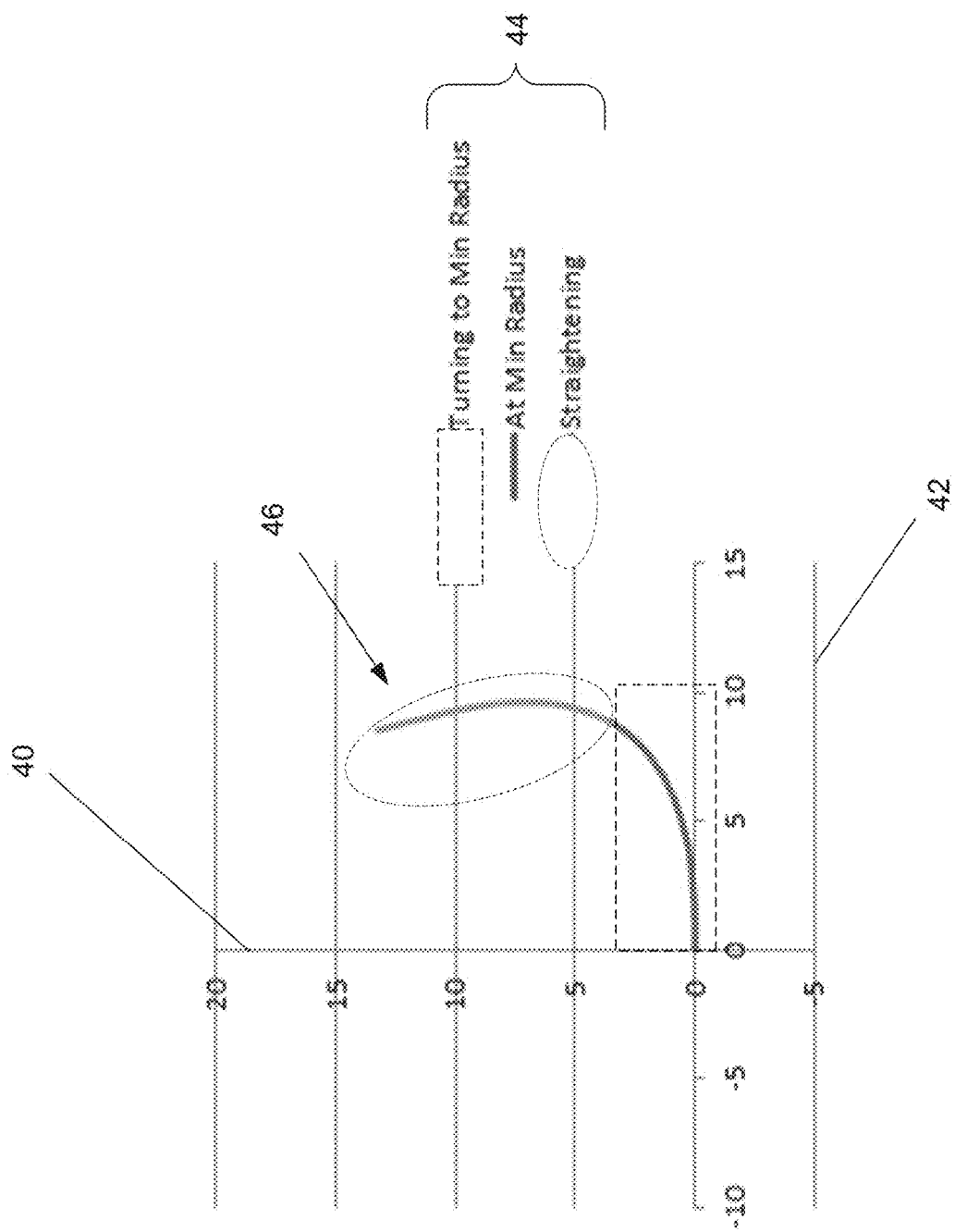
FIGS. 5A-5D are schematic diagrams that illustrate variations in achieving straight lock based on differences in speed for an embodiment of a vehicle guidance system.
Figure 5B:
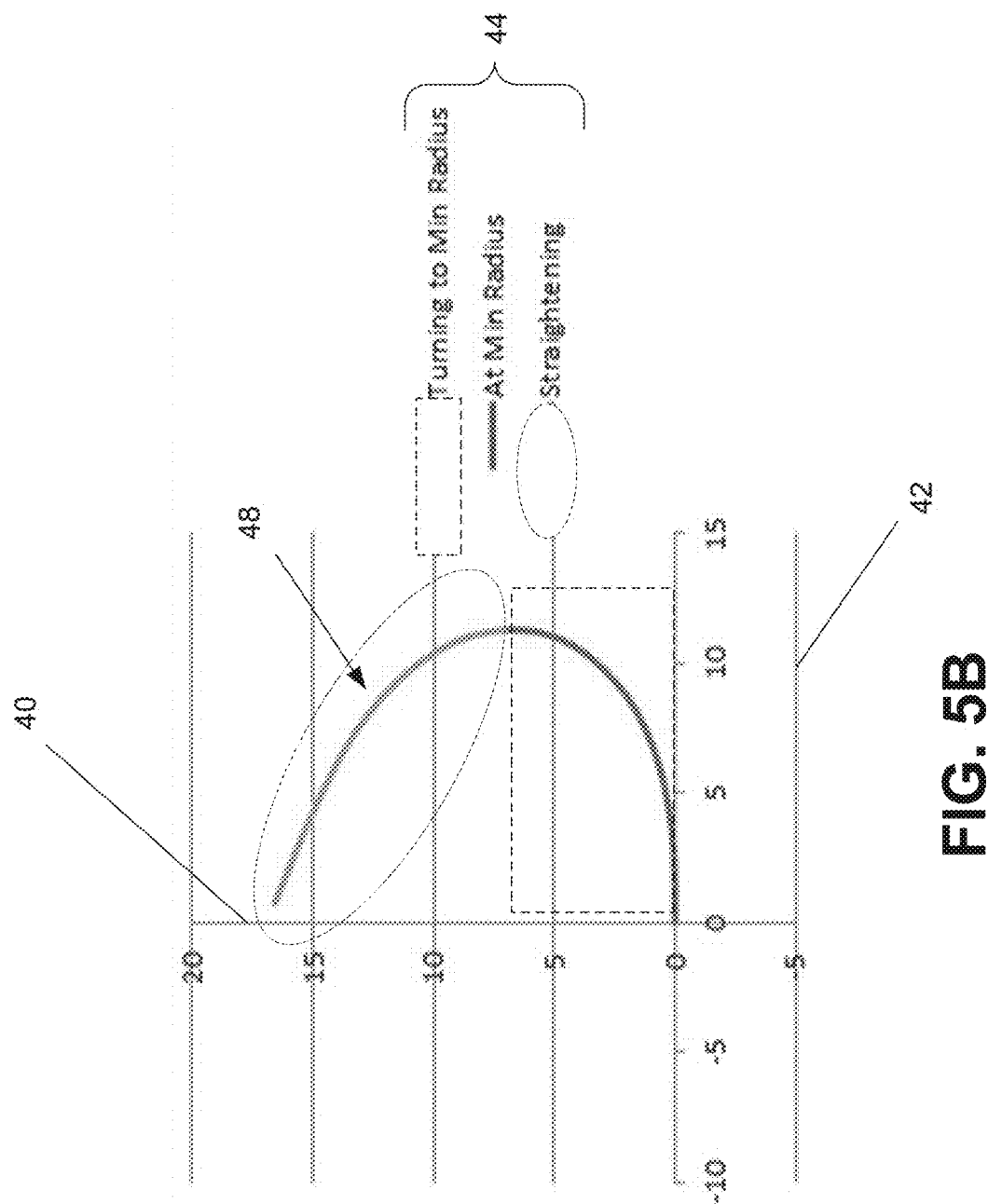
Figure 5C:
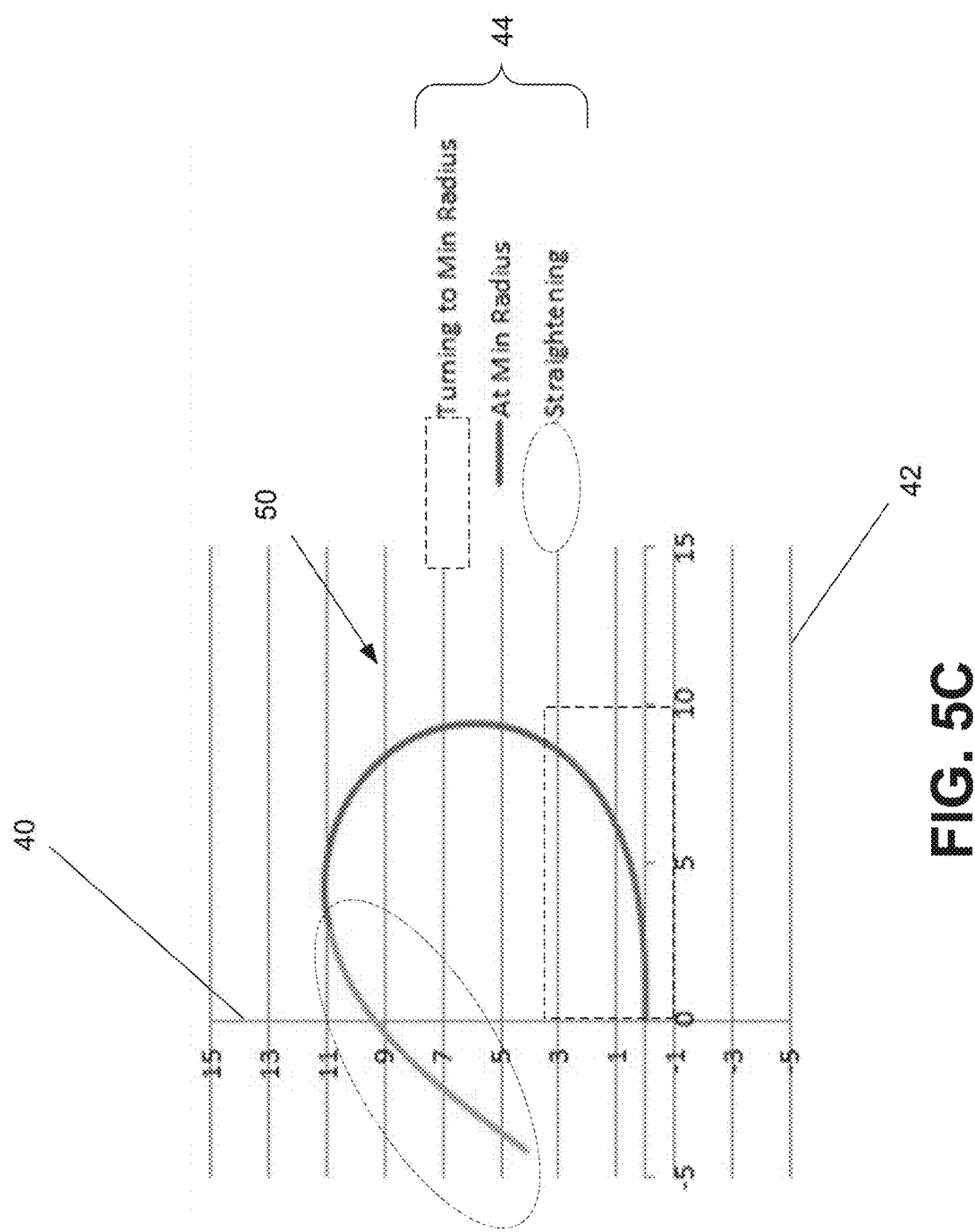
Figure 5D:
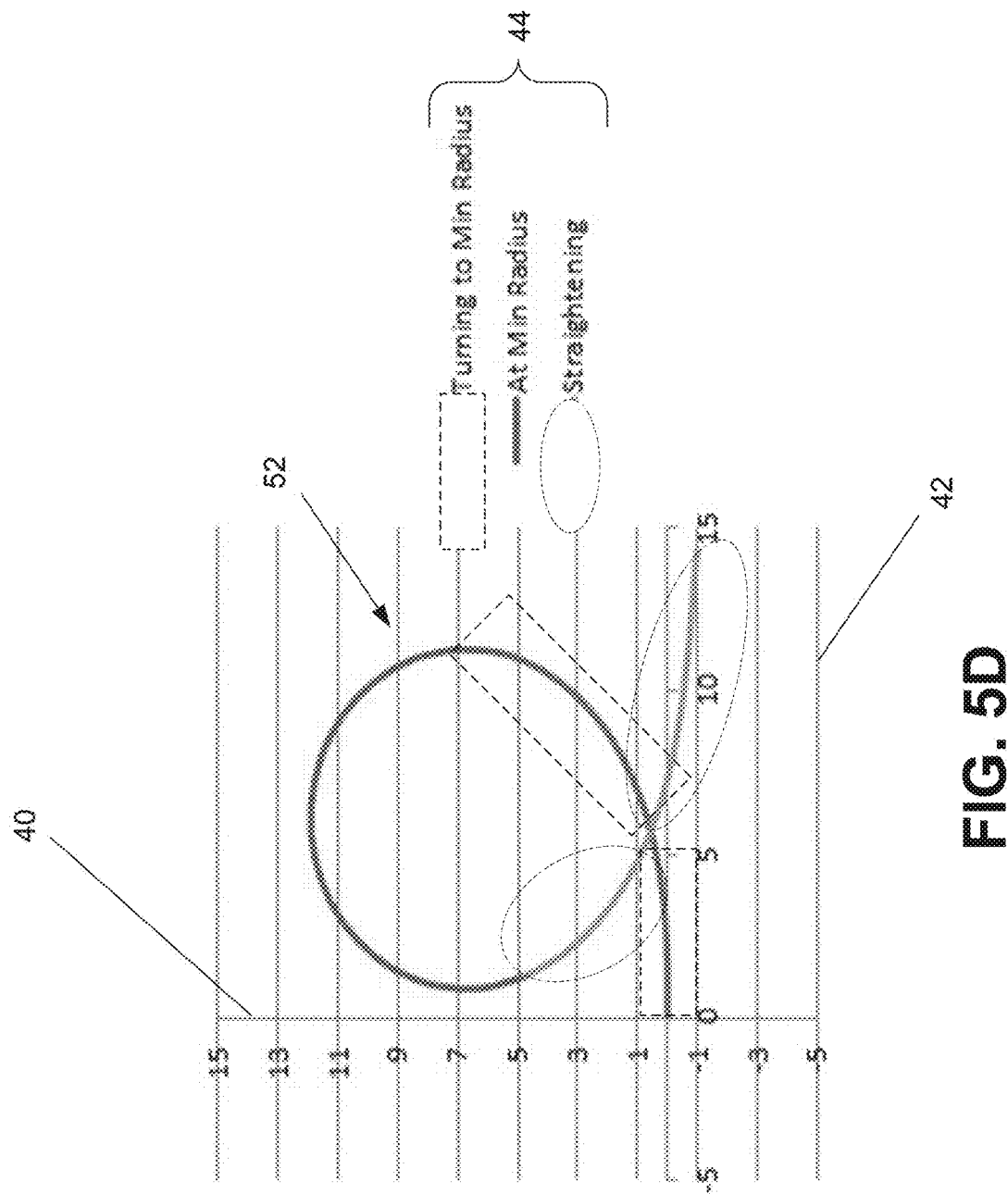

As noted previously, the larger, variable radius circle 22 (FIG. 1) comprises a variable or dynamic radius depending on the speed of the vehicle 10 (FIG. 1), which impacts the nature of the alternative path dictated by an embodiment of a vehicle guidance system. FIGS. 5A-5D are schematic diagrams that illustrate variations in achieving straight lock based on differences in speed for an embodiment of a vehicle guidance system. That is, FIGS. 5A-5D provide some illustrative, non-limiting examples based on example parameters of wheel base, speed, and minimum turning radius for one type of vehicle, with the understanding that other parameters for the same or other types of vehicles may illustrate a similar overall or conceptual behavior. A vertical axis 40 and horizontal axis 42 for FIGS. 5A-5D correspond similarly to the axes shown in FIG. 3, and in particular, have parameters of time (in seconds) and curvature, respectively. A legend 44 shows what the portions of each respective curve represent using geometrical symbols, or the absence thereof, overlapping the respective portion of the curve, with a dashed rectangle surrounding a portion of the curve corresponding to turning to a minimum radius, the absence of a geometric symbol overlapping a portion of the curve representing navigation according to a minimum radius, and a dashed ellipse or oval surrounding a portion of the curve corresponding to straightening. Referring to FIG. 5A, assume a wheel base of three (3) meters (m), a wheel straight lock time of zero (0) milliseconds (msec), and a speed of 1 m/s (or 3.6 kilometers (km)/hour (h). As depicted in FIG. 5A, a curve 46, corresponding to the path traveled by the vehicle, comprises a portion from a zero wheel straight lock time to the minimum radius (as surrounded by the dashed rectangle), followed immediately with a straightening (as surrounded by the dashed ellipse or oval). In other words, as soon as the vehicle achieves maximum lock, the process of straightening the wheels begins, with the vehicle turning about 114 degrees in this example. Referring to FIG. 5B, assuming a retention of the parameters underlying the example of FIG. 5A yet with a change in speed of the vehicle (e.g., to 1.5 m/s or 5.4 km/h), the curve 48 corresponding to the path traveled by the vehicle reveals that the vehicle turns more than in FIG. 5A, from turning to minimum radius to straightening. This behavior is the result of the fact that at a constant rate of turning with changing speed, a different turning amount is required and hence exhibited in FIG. 5B. In this example, the vehicle has turned approximately 156 degrees. In FIG. 5C, an illustration is provided where there is an intervening travel according to the minimum radius. That is, assuming the parameters used for the example vehicle in FIG. 5A with the additional feature or action of the vehicle remaining at the minimum angle (corresponding to the minimum radius) for one (1) second before straightening, the curve 50 results. FIG. 5D assumes the same parameters as the example in FIG. 5C, with the exception that the speed of the vehicle is increased to 1.5 m (5.4 km/h). As noted by the curve 52, the vehicle spends more time at the minimum angle than when the vehicle has a lower speed (FIG. 5C).

Figure 6B:
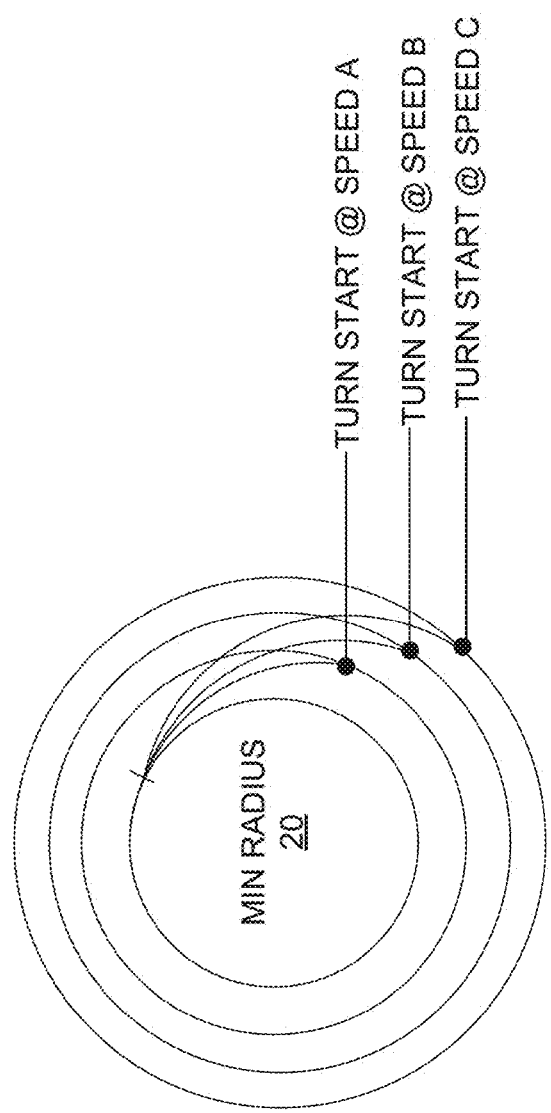

Attention is now directed to FIGS. 6A-6D, which are schematic diagrams that graphically illustrate methodology underlying an embodiment of a vehicle guidance system in detecting a non-drivable segment and providing an alternative path. Beginning with FIG. 6A, shown is a circle representing the minimum turning radius circle 20 of a given vehicle (e.g., vehicle 10, FIG. 1), and curved or ellipse-like sections 24 and 26 to be traveled by the vehicle (e.g., traveling in this example in a counter-clockwise fashion), as similarly illustrated in FIGS. 1 and 2. As shown in FIG. 6A, throughout the example designed travel path, there is the first ellipse-like section 24 corresponding to a time spent (or to be spent) by the vehicle getting from a tangent point (e.g., tangent point A, FIG. 1) to a minimum radius (tangent to the minimum turning radius circle 20), followed by a portion of the minimum turning radius circle 20 that the vehicle optionally travels along, followed by the second ellipse-like section 26 corresponding to a time spent (or to be spent) by the vehicle straightening or, equivalently, getting to a tangent point (e.g., tangent point B, FIG. 1) of an exit path (e.g., exit path 18, FIG. 1). In other words, to negotiate a non-drivable segment, an embodiment of a vehicle guidance system determines an alternative path comprising the ellipse-like section 24 that enables guided travel to a minimum turning radius (to circle 20), followed optionally by navigation according to the minimum radius, followed by the ellipse-like section 26 to achieve straightening. As illustrated in FIG. 6A, to reach a specific end point (a tangent of the exit path), the vehicle needs to leave the minimum turning radius circle 20 at a specific point, which in turn means the vehicle needs to get to the minimum radius before that point. It is noted that the curved paths correspond to a given (acute) angle, wherein a less acute (e.g., more obtuse) angle beyond that shown does not require that the minimum turning radius be reached (e.g., because the turn is not too tight).

Referring now to FIG. 6B, shown is the minimum radius circle and several circles that surround the minimum radius circle, the several paths corresponding to different travel speeds. FIG. 6B provides another illustration of the underlying concepts shown in, and described in association with, FIGS. 5A-5D. The speed of travel in FIG. 6B is such that C>B>A (e.g., C is 15 km/h, B is 10 km/h, and A is 5 km/h, but not limited to these example speeds). In certain embodiments of a vehicle guidance system, the speed of the vehicle before negotiating a turn is a factor in determining when to commence the turn in an ellipse-like or curved manner. For instance, at a travel speed of C, the vehicle begins to turn to get to the minimum turning radius circle 20 before the time the vehicle starts turning for speeds A and B. Similarly, at a travel speed of B, the vehicle starts turning to get to the minimum turning radius circle 20 before the time the vehicle starts turning for speed A. That is, the faster the vehicle is traveling, the sooner the vehicle needs to commence the turn to get to the minimum turning radius circle 20.

Figure 6C:
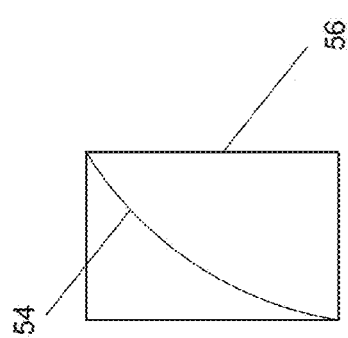
Figure 6D:
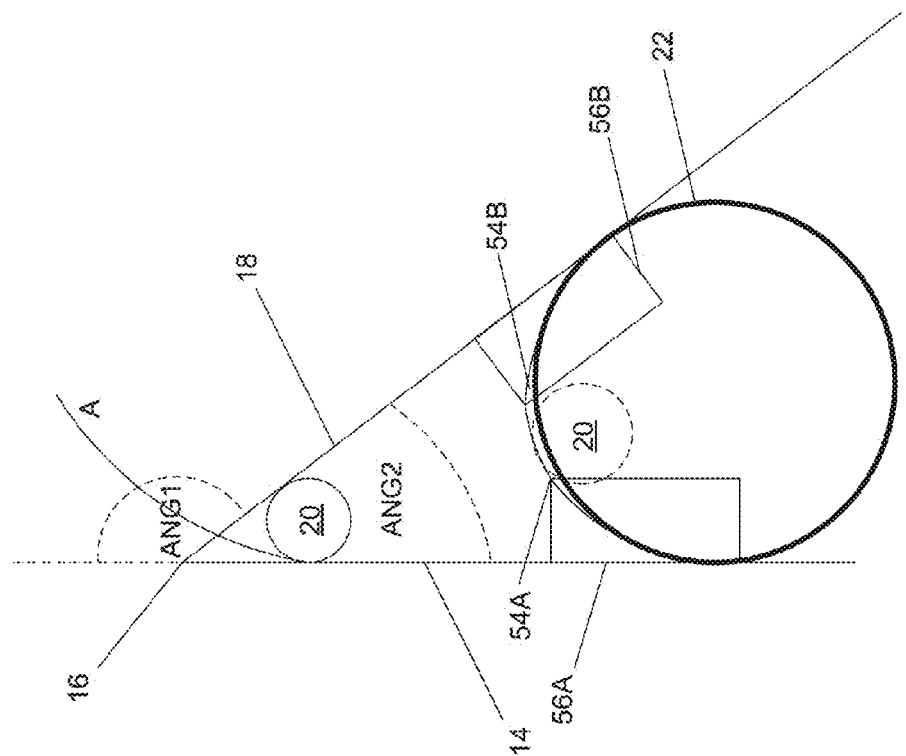

FIGS. 6C and 6D consolidate the underlying method explained in FIGS. 6A and 6B. With regard to FIG. 6C, software of an embodiment of a vehicle guidance system represents the ellipse-like or curved sections to be traversed (e.g., to enable straight to full lock or to enable full-lock to straight) with an ellipse-like or curved line 54 within a bounding box or rectangle 56. The time it takes to get to full lock is typically fixed per machine, although rapidity in the turn may be desired. The software of an embodiment of a vehicle guidance system uses the bounding box 56, wherein the length and width of the bounding box 56 changes based on the speed of the vehicle. For instance, the length of the bounding box 56 corresponds to the time to get to full lock at a given speed (e.g., the slower the vehicle is traveling, the smaller the box, and vice versa). Turning now to FIG. 6D, point A illustrates an expected overshoot one would expect of using the conventional method of merely inserting the minimum turning radius circle 20 as far as possible into the turn corresponding to the intersection point 16. Note the use of a depicted outer angle, ANG1, created by the input path 14 and exit path 18 of one hundred thirty-five (135) degrees, which is merely illustrative of one example, with the understanding that other outside angles may be used in some embodiments and/or implementations. In one embodiment, a vehicle guidance method measures (e.g., using software) the outer angle (ANG1) created by the input and exit paths 14 and 18, respectively. Based on the speed and turning rate for the vehicle (e.g., as monitored by one or more sensors of the vehicle and/or as calculated based on programmed or inputted parameters), the vehicle guidance method calculates a heading (ANG2) of the vehicle (e.g., forty-five (45) degrees in this example). The vehicle guidance method uses the following formula (1):

$$ANG\_MIN = ANG1 - 2*ANG2 \tag{1}$$

In particular, the vehicle guidance method computes (1), which informs the vehicle guidance method how many degrees the vehicle needs to spend at the minimum turning circle. If the result is negative, then the minimum turning radius does not need to be reached to negotiate the corner (i.e., the turn does not represent a non-drivable segment). The vehicle guidance method adds (sums) the X,Y distance traveled turning to full lock, the X,Y distance traveled in the minimum turning radius, and the X,Y distance to orient the wheels of the vehicle to straight. The resulting sum provides the offset of two points on the larger, variable radius circle 22. Since one of the two solutions is negative, the negative solution is discarded, resulting in the larger, variable radius circle 22, which is used to detect a non-drivable segment. The use of the larger, variable radius circle 22 derived from the ellipse-like sections 54 (54A, 54B) and bounding boxes 56 (56A, 56B), the latter which account for speed of the vehicle, enables the earlier detection (e.g., earlier than use of only the minimum turning radius circle 20) of non-drivable paths, enabling compensation by the vehicle for the time it takes to achieve full lock and a minimum radius turn. As the speed changes, certain embodiments of a vehicle guidance method may recalculate the radius of the larger, variable radius circle 22 (or in some embodiments, a look-up table may be accessed to obtain an association between the speed and the radius of the circle 22).

Figure 7A:
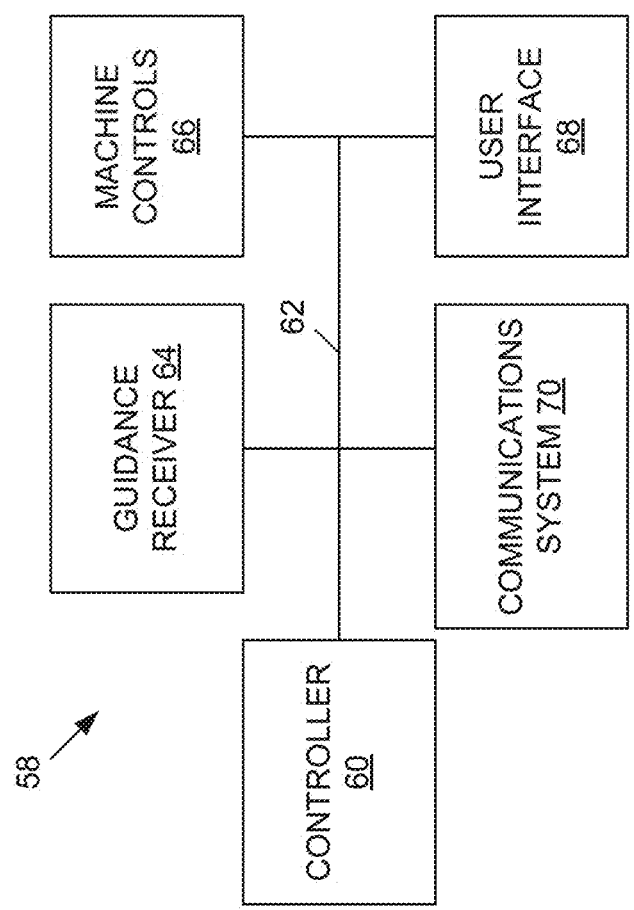
FIG. 7A is a block diagram that illustrates an embodiment of an example control system for an embodiment of a vehicle guidance system.

Attention is now directed to FIG. 7A, which illustrates a control system 58 that may be used in an embodiment of a vehicle guidance system. It should be appreciated within the context of the present disclosure that some embodiments may include additional components or fewer or different components, and that the example depicted in FIG. 7A is merely illustrative of one embodiment among others. The control system 58 may reside entirely in the vehicle (e.g., vehicle 10, FIG. 1), or in some embodiments, functionality of the control system 58 may be distributed among plural devices or systems (e.g., within the vehicle and external to the vehicle 10). The control system 58 comprises one or more controllers, such as controller 60, which in one embodiment, may be configured as an electronic control unit (ECU). The controller 60 is coupled to a network 62 (e.g., a controller area network (CAN), such as in conformance to ISO 11898, ISO 11783, etc.), though in some embodiments, other protocols and/or standards (e.g., RS 232) may be used. The network 62 may comprise one or more networks. Also coupled to the network 62 is a guidance receiver 64 (e.g., such as a Global Navigation Satellite System (GNSS) receiver, which includes the ability to access one or more constellations jointly or separately), machine controls 66, a user interface 68, and a communications system 70. The machine controls 66 collectively comprise the various actuators, sensors, and/or subsystems residing on the vehicle 10 (FIG. 1), including those used to control machine navigation (e.g., speed, direction (such as a steering system), etc.), implement (e.g., header or trailer) position, and/or control of internal processes, among others. The user interface 68 may be a keyboard, mouse, microphone, touch-type or other type display device, joystick/multifunction handle, steering wheel, and/or other devices (e.g., switches) that enable input by an operator. The guidance receiver 64, as is known, may enable autonomous or semi-autonomous operation of the vehicle 10 in cooperation with the machine controls 66 and the controller 60 (e.g., via software residing in the controller 60). The communications system 70 enables wireless (and/or wired) communication with other devices or systems, such as remote connection to external networks or devices. In one embodiment, the communications system 70 comprises a radio frequency (RF) modem and optionally a cellular modem to enable wireless fidelity (Wi-Fi) and cellular communications, respectively. Note that in some embodiments, functionality for two or more of the components depicted in FIG. 7A may be combined in a single device.

The controller 60 is configured to receive and process information from the communications system 70, the guidance receiver 64, the machine controls 66, and/or the user interface 68. For instance, the controller 60 may receive input from the user interface 68 such as to enable intervention of machine operation by the operator, to provide feedback of a change in speed or direction and/or or an impending change or need or recommendation for change, or to receive instruction to commence and ultimately engage auto-guidance. In some embodiments, the controller 60 may receive input from the machine controls 66 (e.g., such as to enable feedback as to the position or status of certain devices, such as a header height and/or width, and/or speed, direction of the vehicle 10, etc.). The controller 60 is also configured to cause the access of data from a data structure via the communications system 70, such as curvature/time performance of the host vehicle 10. In some embodiments, such information may be stored/accessed locally.

Figure 7B:
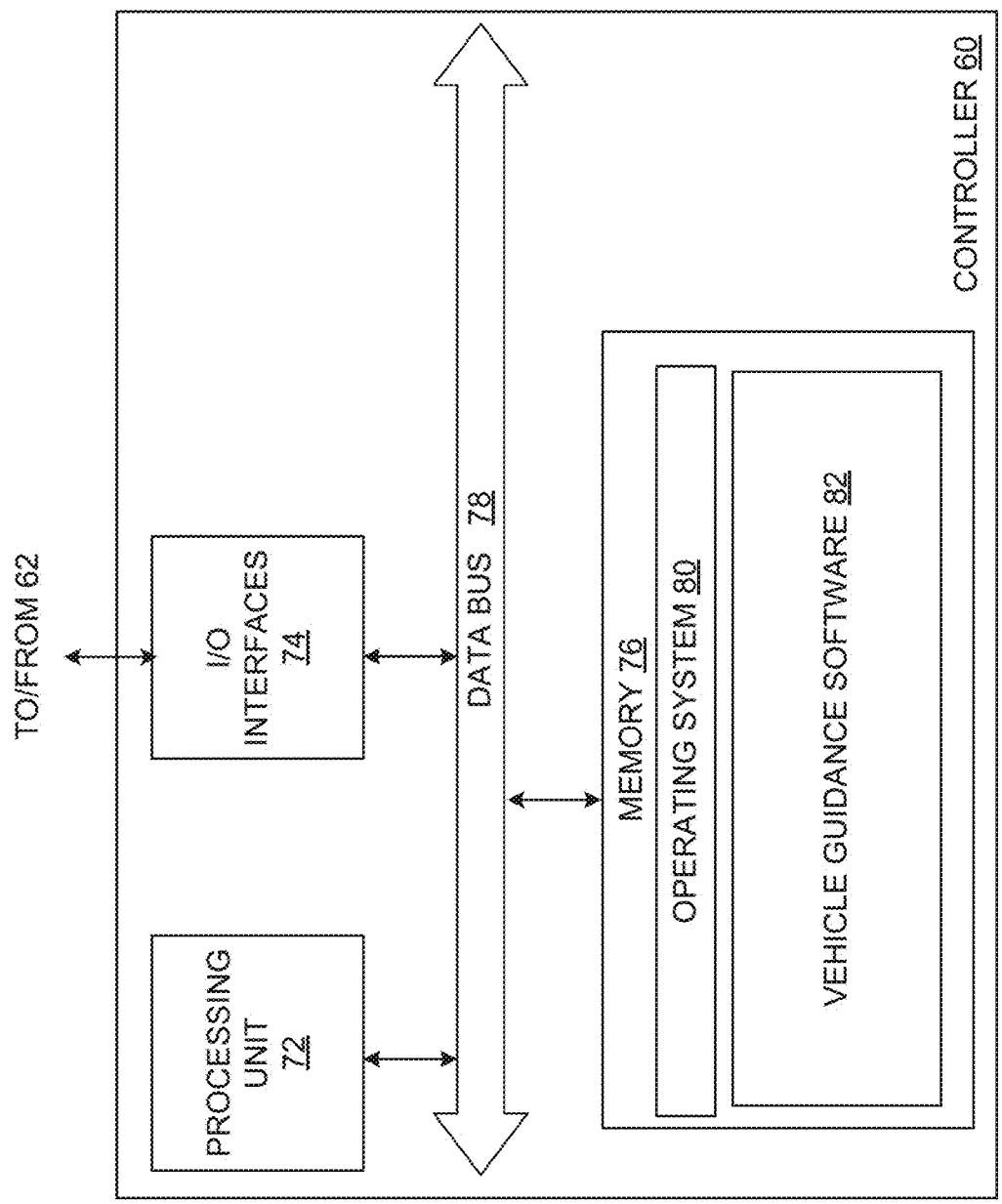
FIG. 7B is a block diagram that illustrates an embodiment of an example controller for the control system of FIG. 7A.

FIG. 7B further illustrates an example embodiment of the controller 60. One having ordinary skill in the art should appreciate in the context of the present disclosure that the example controller 60 is merely illustrative, and that some embodiments of controllers may comprise fewer or additional components, and/or some of the functionality associated with the various components depicted in FIG. 7B may be combined, or further distributed among additional modules, in some embodiments. In some embodiments, one or more of the components and/or functionality of the control system 58 (e.g., user interface 68) may instead be a component of the controller 60, and vice versa. It should be appreciated that, though described in the context of residing in an agricultural vehicle, such as the vehicle 10 (FIG. 1), in some embodiments, the controller 60 or all or a portion of its corresponding functionality may be implemented in a computing device located external to the vehicle. Referring to FIG. 7B, with continued reference to FIG. 7A, the controller 60 is depicted in this example as a computer system, but may be embodied as a programmable logic controller (PLC), application-specific integrated circuit (ASIC), field-programmable gate array (FPGA), among other devices. It should be appreciated that certain well-known components of computer systems are omitted here to avoid obfuscating relevant features of the controller 60. In one embodiment, the controller 60 comprises one or more processing units (herein also, processors), such as processing unit 72, input/output (I/O) interface(s) 74, and memory 76, all coupled to one or more data busses, such as data bus 78. The memory 76 may include any one or a combination of volatile memory elements (e.g., random-access memory RAM, such as DRAM, and SRAM, etc.) and nonvolatile memory elements (e.g., ROM, hard drive, tape, CDROM, etc.). The memory 76 may store a native operating system, one or more native applications, emulation systems, or emulated applications for any of a variety of operating systems and/or emulated hardware platforms, emulated operating systems, etc. In some embodiments, the memory 76 may store one or more data structures comprising information illustrated in FIG. 3 for the vehicle, and optionally other vehicles. In some embodiments, the memory 76 may also store one or more field maps that were recorded from a prior traversal of a given field, enabling autonomous (or semi-autonomous) traversal of a given field when auto-guidance is activated. In the embodiment depicted in FIG. 7B, the memory 76 comprises an operating system 80 and vehicle guidance software 82. It should be appreciated that in some embodiments, additional or fewer software modules (e.g., combined functionality) may be employed in the memory 76 or additional memory. In some embodiments, a separate storage device may be coupled to the data bus 78, such as a persistent memory (e.g., optical, magnetic, and/or semiconductor memory and associated drives).

The vehicle guidance software 82 enables the determination and generation (and implemented use) of waylines, detection of non-drivable segments among the waylines, and the generation (and implementation) of alternative paths based on the detection of the non-drivable segments. In one embodiment, the vehicle guidance software 82 receives operator input to define a contour wayline that is intended to be used for auto-steering the vehicle for a given field or fields. Assuming that after a few passes according to the wayline paths, parts of the next pass become sufficiently sharp that prohibit the vehicle from traversing while remaining under the control of the auto-steer functionality of the vehicle guidance software 82. The vehicle guidance software 82 scans ahead to look for such non-drivable segments in the next path (wayline), and detects the non-drivable segment due to two tangential intercepts with the larger, variable radius circle (e.g., circle 22, FIG. 6B, which is derived based on curved or ellipse-like sections that are computed according to the description associated with FIGS. 6A-6D) to navigate the non-drivable segment according to an alternative path. That is, the vehicle guidance software 82 scans ahead based on the construction of a larger, variable radius circle (e.g., circle 22, FIG. 1) that is derived using the ellipse-like section 54/bounding box 56 (FIG. 6D) construct and associated formula (1) that considers planned or current speed and steering responsiveness (e.g., the data in FIG. 3). The detection by the vehicle guidance software 82 results in the generation by the vehicle guidance software 82 of an alternative drivable path according to the ellipse-like sections 54 and optionally minimum turning radius, which collectively replace the non-drivable segment before the vehicle gets to this segment. Certain embodiments of the vehicle guidance software 82 use one or more factors/data in determining the alternative path. For instance, the vehicle guidance software 82 uses lock-to-lock timing, where a profile of the vehicle (and optionally other vehicles) is used that provides information about the time to turn to different to different curvatures (e.g., all the way to full lock), as shown in FIG. 3. Another factor includes a maximum curvature, which is a minimum turning radius of the vehicle and how this minimum value changes with speed. For instance, the vehicle may permit sharper turns at lower speeds and less sharp turns at higher speeds (e.g., for safety and/or comfort reasons). In general, either before the vehicle starts auto-steering a path or while it is steering on a path (e.g., according to functionality of the vehicle guidance software 82), the vehicle guidance software 82 scans the wayline for non-drivable regions. Such detection is achieved using a geometric construct (e.g., the larger circle 22, FIG. 1) that best represents the capacity of the vehicle to turn at a given speed. The ellipse-like sections that are used to derive the larger circle contemplate the minimum turning radius (the smaller circle) for the current or planned speed of the vehicle and the time it takes to turn the wheels. Usually the larger circle, a logical construct, only intercepts the path once tangentially as it is being "slid" along the path, but in the case of a non-drivable segment, the shape is intercepted twice (e.g., in FIG. 1, at A and B).

In some embodiments, the vehicle guidance software 82 may cause the machine speed to change (e.g., reduce) via interaction with the machine controls 66 (FIG. 7A) in addition to, or instead of, replacing the path based on the speed of the vehicle. In some embodiments, other and/or additional factors may be considered for detecting non-drivable segments and providing an alternative path or change in vehicle operation.

The vehicle guidance software 82 may coordinate inputs from the guidance receiver 64 and automatically output control signals to one or more machine controls 66 to enable guided traversal (e.g., auto-steer) and/or performance of various farming operations on a field. In some embodiments, operator intervention may be involved before (and/or during) implementing auto-steer according to the alternative path.

Execution of the vehicle guidance software 82 may be implemented by the processing unit 72 under the management and/or control of the operating system 80. In some embodiments, the operating system 80 may be omitted and a more rudimentary manner of control implemented. As is known, source statements of the software module 82 may be translated by one or more compilers of the operating system 80 to assembly language and then further translated to a corresponding machine code that the processing unit 72 executes to achieve the detection and alternative path generation functionality of the vehicle guidance system. Variations of this execution process are known, depending on the programming language of the software. For instance, if Java-based, the compiled output may comprise bytecode that may be run on any computer system platform for which a Java virtual machine or bytecode interpreter is provided to convert the bytecode into instructions that can be executed by the processing unit 72. Also, register transfer language (or other hardware description language) may be used to translate source code to assembly language, which the one or more operating system compilers translate to executable machine code.

The processing unit 72 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 60.

The I/O interfaces 74 provide one or more interfaces to the network 62 and other networks. In other words, the I/O interfaces 74 may comprise any number of interfaces for the input and output of signals (e.g., analog or digital data) for conveyance over the network 62. The input may comprise input by an operator (local or remote) through the user interface 68 (e.g., a keyboard, joystick/multifunction handle, steering wheel, and/or mouse or other input device (or audible input in some embodiments)), and input from signals carrying information from one or more of the components of the control system 58, such as the guidance receiver 64, machine controls 66, and/or the communications system 70, among other devices.

When certain embodiments of the controller 60 are implemented at least in part as software (including firmware), as depicted in FIG. 7B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 60 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 8:
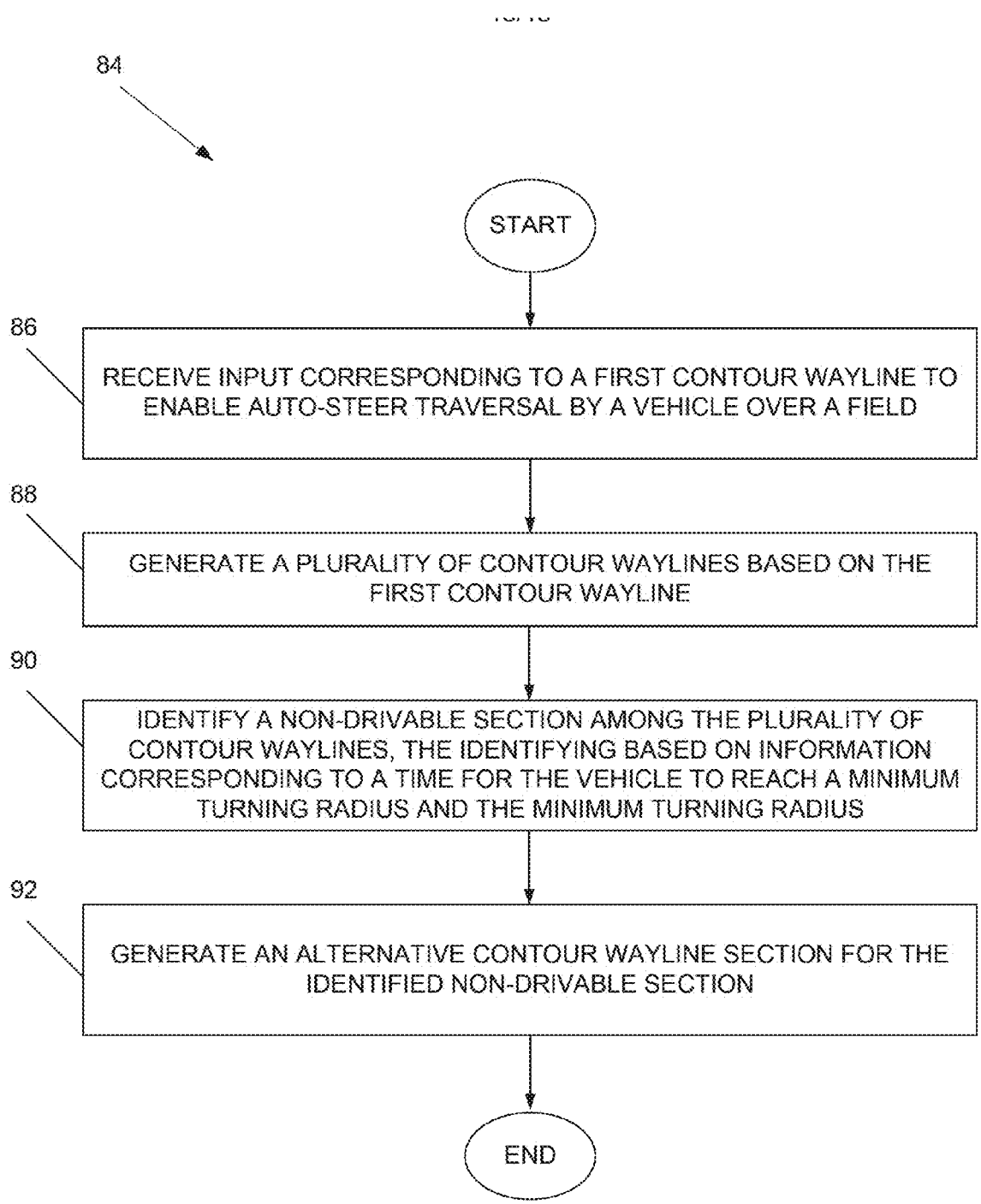
FIG. 8 is a flow diagram that illustrates an embodiment of an example vehicle guidance method.

Having described certain embodiments of a vehicle guidance system, it should be appreciated within the context of the present disclosure that one embodiment of a vehicle guidance method, denoted as method 84 as illustrated in FIG. 8, comprises receiving input corresponding to a first contour wayline to enable auto-steer traversal by a vehicle over a field (86); generating a plurality of contour waylines based on the first contour wayline (88); identifying a non-drivable section among the plurality of contour waylines, the identifying based on information corresponding to a time for the vehicle to reach a minimum turning radius and the minimum turning radius (90); and generating an alternative contour wayline section for the identified non-drivable section (92).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the vehicle guidance system, particularly, any "preferred" embodiments, are merely possible examples of implementations, merely set forth for a clear understanding of the principles of the vehicle guidance system. Many variations and modifications may be made to the above-described embodiment(s) of the disclosure without departing substantially from the spirit and principles of the vehicle guidance system. All such modifications and variations are intended to be included herein within the scope of the vehicle guidance system and protected by the following claims.

At least the following is claimed:

1. A method, comprising:
receiving, by a vehicle guidance system, input corresponding to a first contour wayline to enable auto-steer traversal by the vehicle over a field;
generating, by the vehicle guidance system, a plurality of contour waylines based on the first contour wayline;
identifying, by the vehicle guidance system, a non-drivable section among the plurality of contour waylines, the identifying based on information corresponding to a time for the vehicle to reach a minimum turning radius;
generating, by the vehicle guidance system, an alternative contour wayline section for the identified non-drivable section; and
causing, by the vehicle guidance system, the auto-steer traversal by the vehicle of the field according to the plurality of contour waylines and according to the alternative contour wayline section for the non-drivable section,
wherein identifying the non-drivable section comprises logically scanning the plurality of contour waylines with a defined geometrical area and detecting when the defined geometrical area intersects two contiguous sections of one of the plurality of contour waylines.

2. The method of claim 1, wherein identifying the non-drivable section is further based on information corresponding to speed of the vehicle.

3. The method of claim 2, further comprising determining a speed for which the vehicle is to traverse the alternative contour wayline section.

4. The method of claim 3, further comprising causing the auto-steer traversal by the vehicle of the field according to the alternative contour wayline section in place of the non-drivable section based on the determined speed.

5. The method of claim 1, wherein identifying the non-drivable section is without operator intervention.

6. The method of claim 1, wherein the defined geometrical area is based on one or more curved sections.

7. The method of claim 1, wherein generating the alternative contour wayline section for the identified non-drivable section occurs before the vehicle reaches the non-drivable section.

8. The method of claim 1, wherein the non-drivable section comprises a section that the vehicle physically cannot turn on when navigating according to the associated contour line.

9. A system, comprising:
a vehicle comprising a global navigation satellite system (GNSS) receiver and a controller coupled to the GNSS receiver and a vehicle drive system, the controller configured to:
  receive input corresponding to a first contour wayline to enable auto-steer traversal by the vehicle over a field;
  generate a plurality of contour waylines based on the first contour wayline;
  identify a non-drivable section among the plurality of contour waylines by logically scanning the plurality of contour waylines with a defined geometrical area and determining when the defined geometrical area intersects two contiguous sections of one of the plurality of contour waylines, the identifying based on information corresponding to a time for the vehicle to reach a minimum turning radius;
  generate an alternative contour wayline section for the identified non-drivable section; and
  cause the vehicle drive system to auto-steer across the field according to the plurality of contour waylines and according to the alternative contour wayline section for the non-drivable section.

10. The system of claim 9, wherein the controller is configured to identify the non-drivable section based on information corresponding to speed of the vehicle.

11. The system of claim 10, wherein the controller is configured to determine a speed for which the vehicle is to traverse the alternative contour wayline section.

12. The system of claim 11, wherein the controller is configured to cause the vehicle drive system to auto-steer across the field according to the alternative contour wayline section in place of the non-drivable section based on the determined speed.

13. The system of claim 9, wherein the controller is configured to identify the non-drivable section without operator intervention.

14. The system of claim 9, wherein the defined geometrical area is based on one or more curved sections.

15. The system of claim 9, wherein the controller is configured to generate the alternative contour wayline section for the identified non-drivable section before the vehicle reaches the non-drivable section.

* * * * *